(12) United States Patent
Vishnoi

(10) Patent No.: US 11,061,640 B2
(45) Date of Patent: Jul. 13, 2021

(54) MOBILE APP CO-BROWSING SYSTEM AND METHOD

(71) Applicant: Tagove Limited, Mountain View, CA (US)

(72) Inventor: Laduram Vishnoi, San Francisco, CA (US)

(73) Assignee: Tagove Limited, Mountain View, CA (US)

( * ) Notice: Subject to any disclaimer, the term of this patent is extended or adjusted under 35 U.S.C. 154(b) by 0 days.

(21) Appl. No.: 16/455,249

(22) Filed: Jun. 27, 2019

(65) Prior Publication Data

US 2020/0333996 A1   Oct. 22, 2020

Related U.S. Application Data

(60) Provisional application No. 62/694,670, filed on Jul. 6, 2018.

(51) Int. Cl.
*G09G 5/00* (2006.01)
*G06F 3/14* (2006.01)
*H04M 1/72415* (2021.01)
*H04M 1/72445* (2021.01)
*H04M 1/72448* (2021.01)

(52) U.S. Cl.
CPC ...... *G06F 3/1454* (2013.01); *H04M 1/72415* (2021.01); *H04M 1/72445* (2021.01); *H04M 1/72448* (2021.01)

(58) Field of Classification Search
USPC ..... 345/2.3, 173, 156, 174; 709/204; 463/31
See application file for complete search history.

(56) References Cited

U.S. PATENT DOCUMENTS

| | | | |
|---|---|---|---|
| 10,104,427 B1 * | 10/2018 | Zabetian | H04N 21/4788 |
| 2014/0121014 A1 * | 5/2014 | Kelly | G07F 17/3239 463/31 |
| 2016/0062723 A1 * | 3/2016 | Spencer | G06F 3/1423 709/204 |
| 2017/0359422 A1 * | 12/2017 | Tarricone | H04L 69/24 |
| 2019/0034149 A1 * | 1/2019 | Spencer | G06F 3/1423 |
| 2019/0095403 A1 * | 3/2019 | Parhar | G06F 16/986 |
| 2019/0141399 A1 * | 5/2019 | Auxer | H04N 21/4753 |
| 2019/0245819 A1 * | 8/2019 | Ohman | H04L 51/12 |
| 2019/0260966 A1 * | 8/2019 | Leatherman, III | G06F 3/1454 |
| 2019/0312746 A1 * | 10/2019 | Myers, III | H04L 41/0806 |

(Continued)

*Primary Examiner* — Thuy N Pardo
(74) *Attorney, Agent, or Firm* — Fenwick & West LLP

(57) ABSTRACT

A mobile app co-browsing method includes providing a customer mobile device with a mobile application and a co-browsing SDK installed; requesting a screen associated with the mobile application through a media server; receiving authorization from a customer to initiate sharing of the screen with the media server; receiving data associated with the screen and converting the data into a video stream via the media server; sending the video stream to a computing device with an agent, the video stream providing a representation of the screen; allowing an agent to mark-up the screen to create a marked-up screen; receiving data associated with the marked-up screen and converting the data into a second video stream via the media server; and transmitting the second video stream back to the customer mobile device such that the marked up screen is displayed to the customer.

18 Claims, 5 Drawing Sheets

(56) References Cited

U.S. PATENT DOCUMENTS

| | | | |
|---|---|---|---|
| 2020/0045519 A1* | 2/2020 | Raleigh | G06F 3/0482 |
| 2020/0175222 A1* | 6/2020 | Sherwood | H04N 21/41407 |
| 2020/0177650 A1* | 6/2020 | Vu | H04W 4/70 |
| 2020/0252681 A1* | 8/2020 | Eubanks | G06Q 20/123 |
| 2020/0296154 A1* | 9/2020 | Vysotsky | G06K 19/06028 |

* cited by examiner

MOBILE APP CO-BROWSING SYSTEM AND METHOD

BACKGROUND

1. Field of the Invention

The present invention relates generally to mobile applications, and more specifically to co-browsing in mobile applications. Co-browsing is a process whereby a user can share a mobile app screen to an agent (a customer support representative) without downloading any external app or software. The agent can then provide assistance via drawing on the screen, or chatting, or the like, which is then reflected back the customer.

2. Description of Related Art

Screen sharing systems are well known in the art and are effective means to assist users with technical difficulty. For example, FIG. 1 depicts a flowchart 101 of a conventional screen sharing system, wherein the customer has a question about a screen and connects with an agent, as shown with boxes 103, 105. In these conventional systems, the agent will typically take over the customer's screen and manipulate the screen as needed for assistance, as shown with boxes 107, 109.

One of the problems commonly associated with method 101 is security. For example, the customer may be uncomfortable with the agent taking over their screen and thereby having access to their screen.

In addition, conventional methods of providing support to mobile devices, such as smart phones, is limited. The present invention provides a means to easily assist a user of a mobile device.

Accordingly, although great strides have been made in the area of mobile applications and screen sharing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
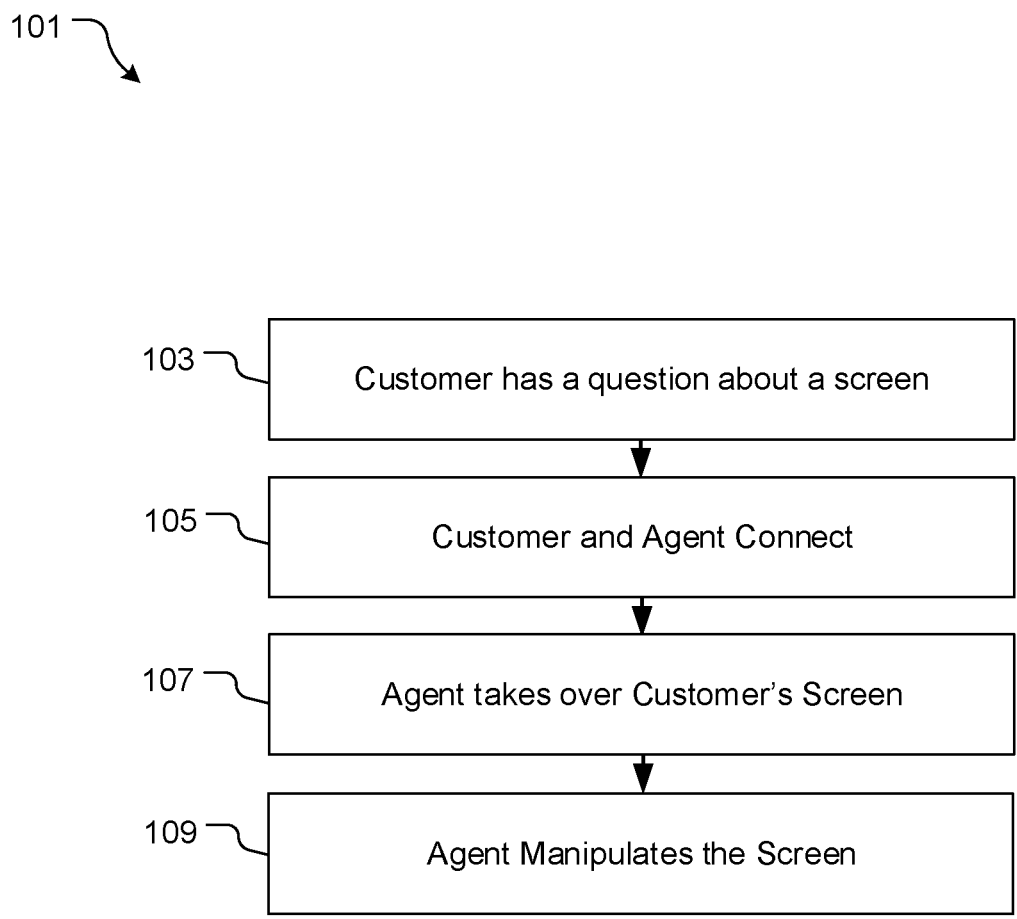
FIG. 1 is a flowchart of a method of a common screen sharing system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional screen sharing systems. Specifically, the present invention provides for improved control for the customer, and further provides for efficient co-browsing between an agent and the customer for a mobile device. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
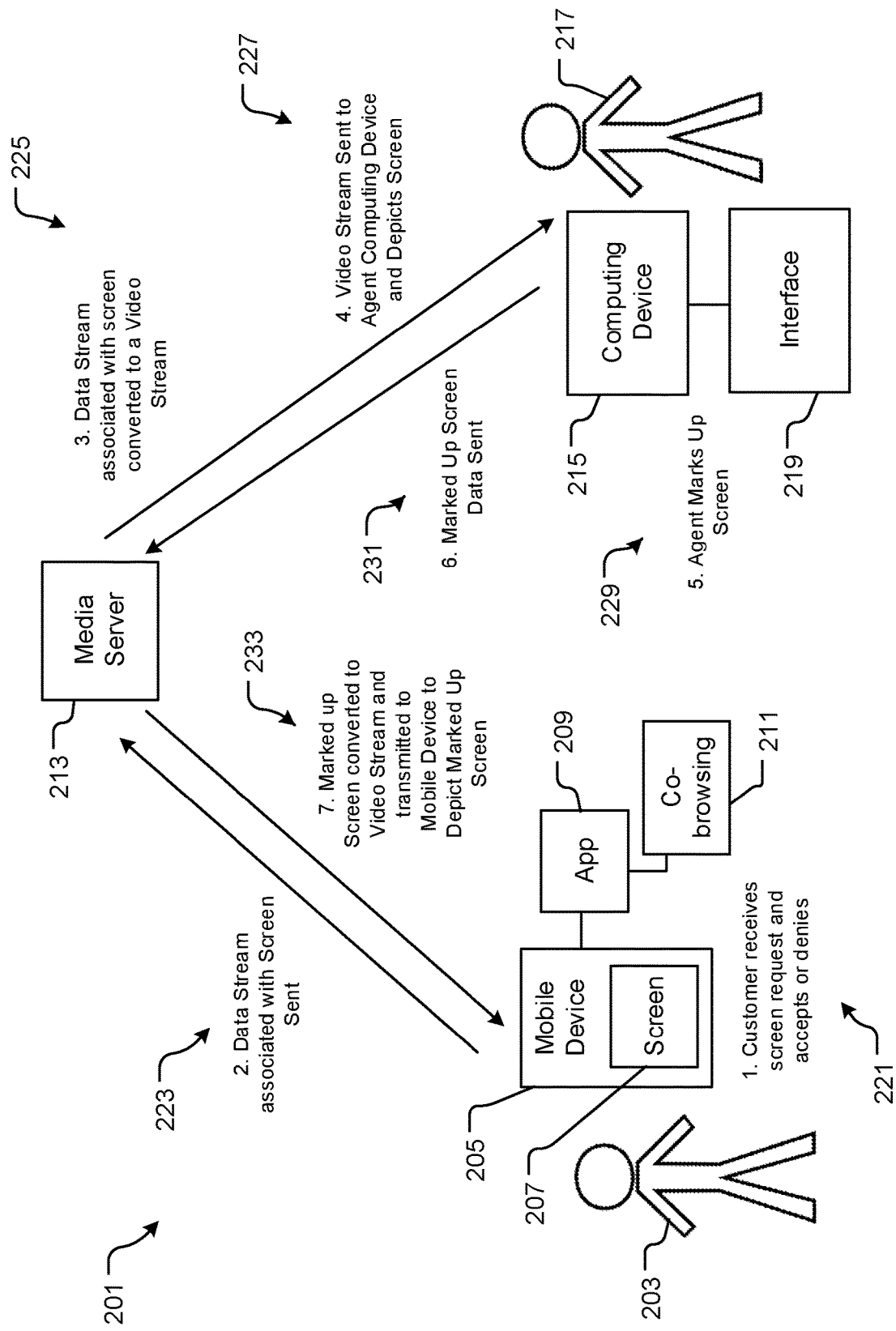
FIG. 2 is a schematic of a co-browsing system in accordance with a preferred embodiment of the present application.

Referring now to the drawings wherein like reference characters identify corresponding or similar elements throughout the several views, FIG. 2 depicts a schematic of a co-browsing system 201 in accordance with a preferred embodiment of the present application. It will be appreciated that system 201 overcomes one or more of the above-listed problems commonly associated with conventional screen sharing systems.

In the contemplated embodiment, system 201 includes a customer 203 with a mobile device 205 having a screen 207, one or more mobile applications 209 downloaded thereon, and a co-browsing SDK 211 installed. It should be appreciated that the co-sharing SDK does not work outside of the mobile application for security concerns for customer personal data. Further, the SDK does not require any extra install on the customer mobile device. It should be appreciated that the mobile device can be any type of smart phone, such as iOS or android.

System 201 further includes a media server 213 in data communication with the customer mobile device 205 as well as an agent computing device 215. In the preferred embodiment, the agent 217 interacts with an interface 219 as will be discussed herein and associated with the computing device 215.

During use of the system, the customer first receives a share screen request 221, wherein the customer can accept or deny. If the user accepts, the process of sharing the screen begins.

The screen sharing process includes a first data stream 223 associated with the customer's screen 207, wherein the first data stream 217 is transmitted to the media server 213. The media server 213 converts the first data stream to a video stream 225, wherein the video stream is sent to the agent computing device to have the screen be depicted 227 on the screen within the interface 219.

The agent can then proceed to mark up the screen 229, such as by drawing on the screen with their mouse. This then creates a marked-up screen data stream 231 which is transmitted back to the media server 213. The media server transmits this to the user device to depict the marked up screen 233. It should be appreciated that this process works in real time, wherein the screen goes back and forth based on the customer.

It should be appreciated that one of the unique features believed characteristic of the present application is the method of allowing a customer to control the screen sharing process in real time, thereby providing them with security during the process.

Figure 3:
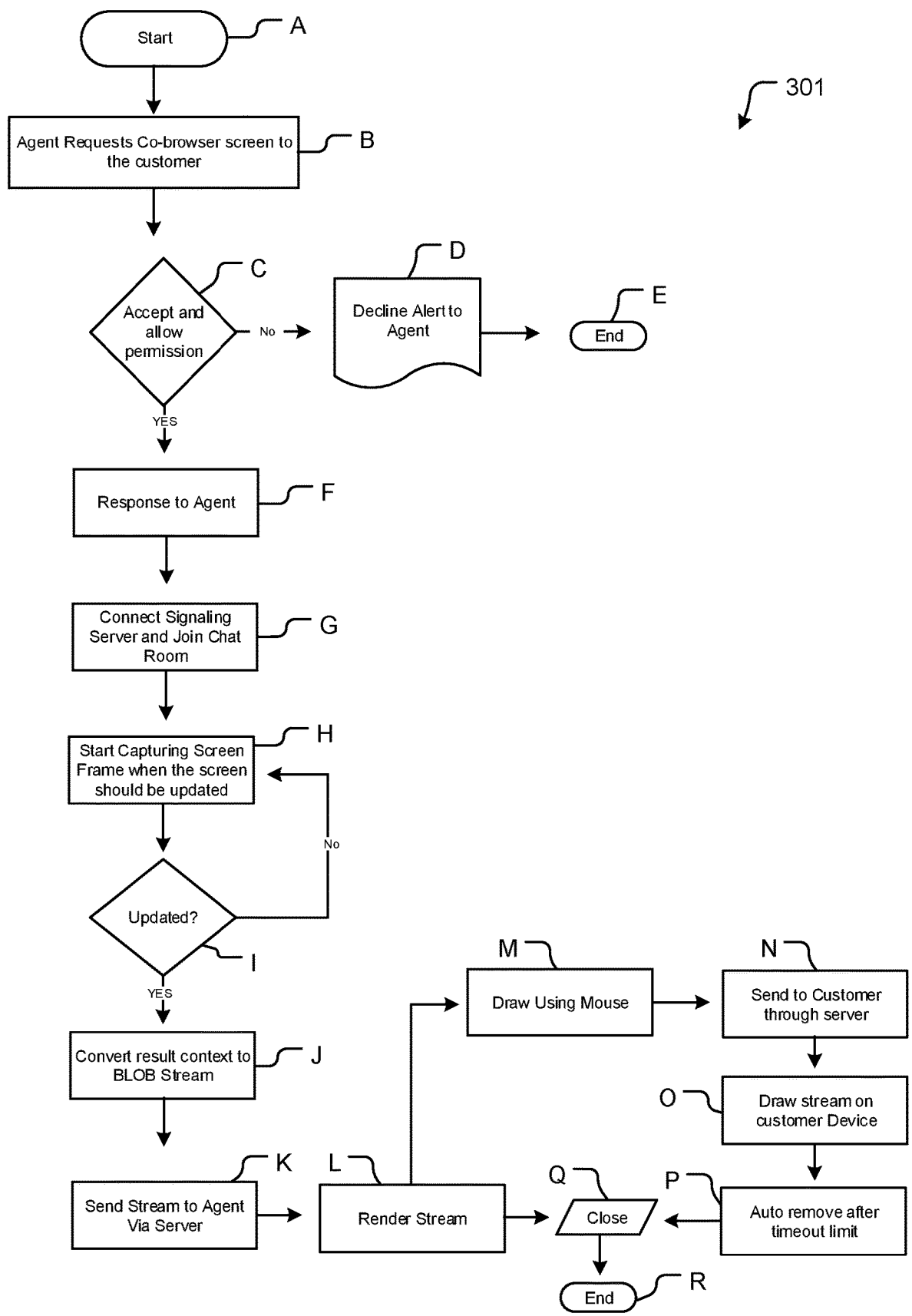
FIG. 3 is a first customer screen in accordance with the present application.

In FIG. 3, a flowchart 301 depicts the method described herein. During use, the process begins with the agent requesting the co-browsing screen from the customer, A, B. The customer can then accept or decline, wherein if the customer declines, the process ends, C, D, E. If the customer accepts, then a response is generated to the agent to connect the customer and the agent via a chat room type experience, F, G. The system will then begin capturing the customer's screen and any updates to the screen, wherein the data is then converted and sent to the agent via the server, H, I, J, K. The agent receives the screen and can draw on the screen, such as through use of a mouse or a touchscreen, L, M. The data associated with the marked up screen is then sent back to through the server, such that the drawings are rendered on the customer device, N, O. In the preferred embodiment, the data is auto removed after a timeout limit and the system is closed and ended, P, Q, R. It should be appreciated that the data is encrypted for safety.

Figure 4:
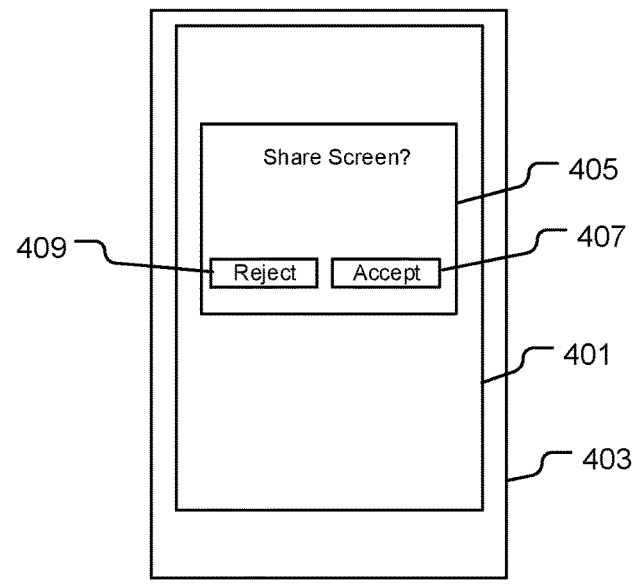
FIG. 4 is a schematic depicting the real-time screen sharing of the present application.

In FIG. 4, a first customer screen 401 associated with a mobile device 403 is shown. The first step requires the customer to receive a request 405 wherein the user can either accept 407 or reject 409.

Figure 5:
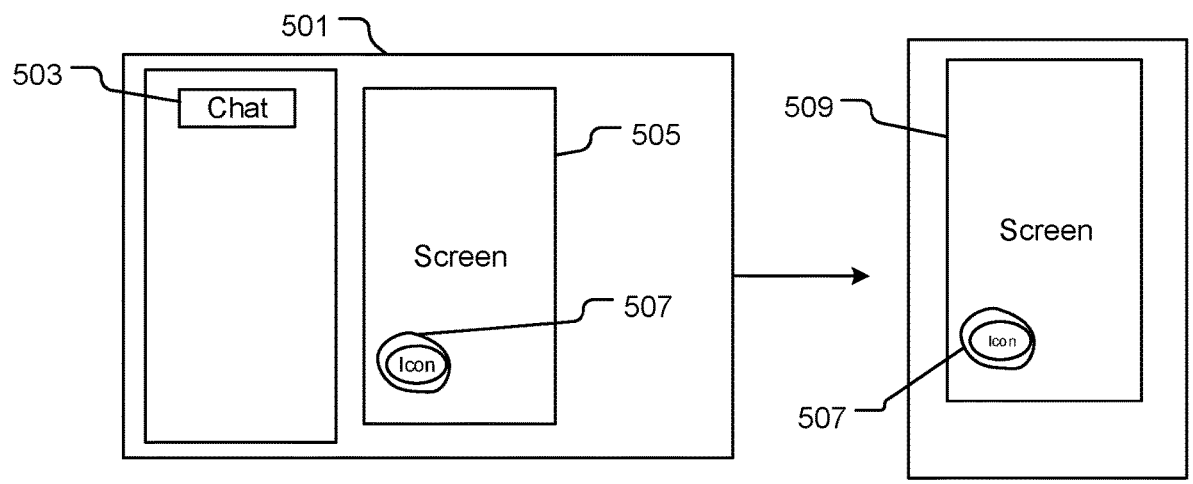
FIG. 5 is a is a schematic of the real-time screen sharing of the present application.

In FIG. 5, a schematic depicts the agent interface 501, wherein the agent is provided with a chat screen 503 for communication with the customer, and wherein the agent is provided with the customer's screen 505 and the agent can mark up 507 the screen. As shown, the mark up 507 is rendered to the customer screen 509.

Figure 6:
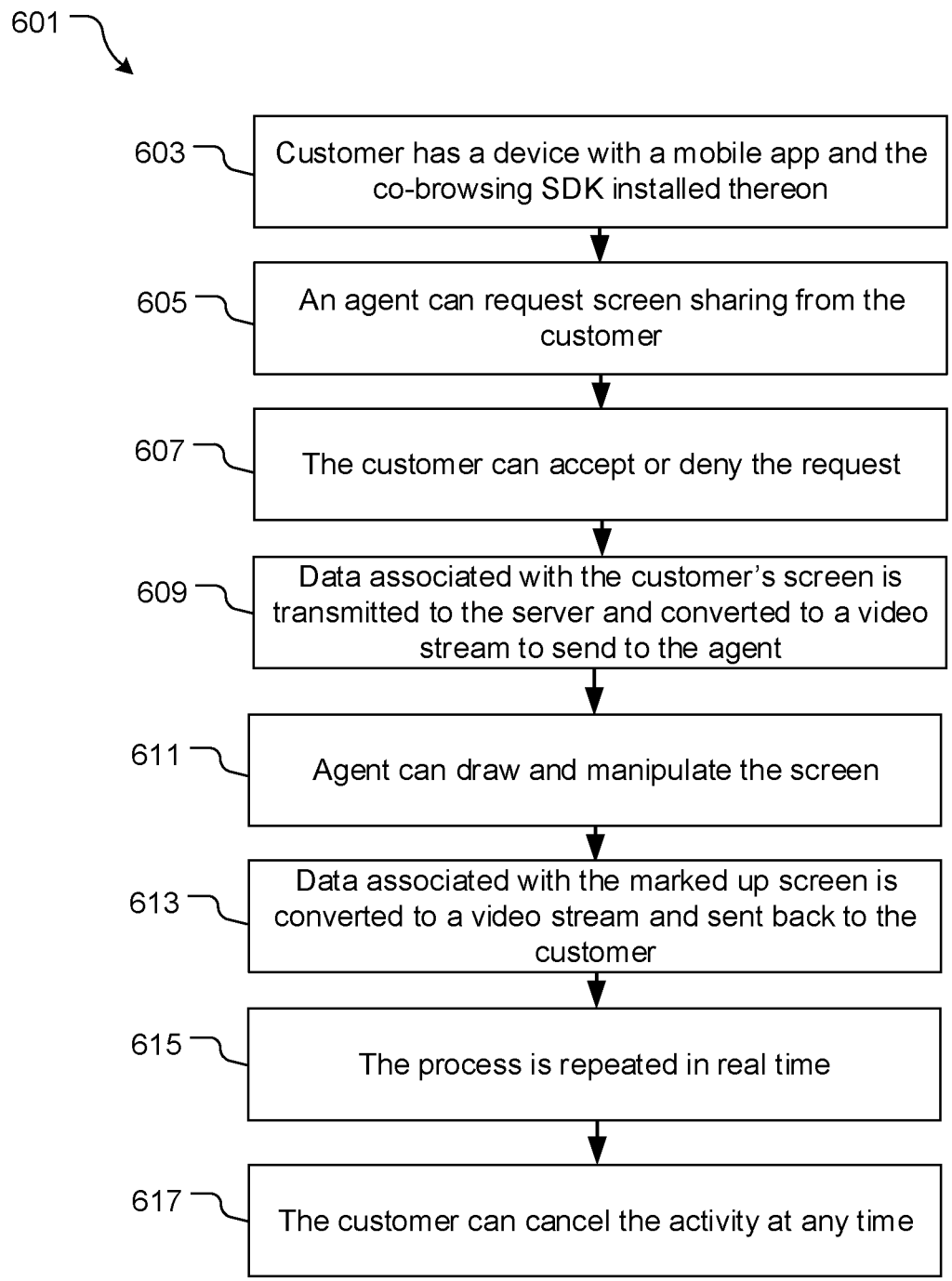
FIG. 6 is a flowchart of the method of the present application.

In FIG. 6, a flowchart 601 depicts the method of the present invention. As shown, the customer has a device with a mobile app and the co-browsing SDK installed thereon, as shown with box 603. The agent requests screen sharing wherein the customer can accept or decline, as shown with boxes 605, 607. Data is then transmitted through the server between the agent and the customer, as shown with boxes 609, 611, 613. The process is repeated in real time, wherein the customer can cancel the activity at any time, as shown with boxes 615, 617.

The media stream server is based on WebRTC data channel protocol where pass the stream from customer mobile screen and make stream in server and pass the signal to agent web screen. Its work exactly how video chat works.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mobile app co-browsing method performed by a media server, the method comprising:
   requesting, from a mobile device having a mobile application and an associated co-browsing software development kit (SDK), a screen associated with the mobile application that is currently being displayed on a display of the mobile device;
   receiving, from the mobile device, authorization to initiate a co-browsing session with an agent computing device;
   receiving, from the mobile device, data associated with displaying the application on the mobile device screen;
   converting the data associated with displaying the current state of the application on the mobile device screen into a video stream that provides a video representation of the data associated with displaying the current state of the application;
   transmitting the video stream to the agent computing device;
   receiving, from the agent computing device, data associated with markups drawn to the video stream at the agent computing device;
   converting the data associated with markups drawn to the video stream into a second video stream, the second video stream displaying the video stream with the markups; and
   transmitting the second video stream to the mobile device such that the mobile device renders the marked up screen for display.

2. The method of claim 1, further comprising:
   receiving a cancelation from the mobile device.

3. The method of claim 1, further comprising:
   encrypting the data associated with the screen and the data associated with displaying the application on the mobile device screen.

4. The method of claim 1, further comprising:
   providing an agent browser screen for display at the agent computing device that includes a chat box and a visual representation of the current state of the application on the mobile device screen.

5. The method of claim 1, further comprising:
   receiving, from the agent computing device, a request to transmit for rendering at the mobile device instructions to perform an action to that will alter the current state of the application on the mobile device screen.

6. The method of claim 1, further comprising:
encrypting the data associated with markups drawn to the video stream.

7. A non-transitory computer-readable storage medium comprising stored computer program instructions executable by at least one processor of a system, the instructions, when executed, causing the processor to:
request, from a mobile device having a mobile application and an associated co-browsing software development kit (SDK), a screen associated with the mobile application that is currently being displayed on a display of the mobile device;
receive, from the mobile device, authorization to initiate a co-browsing session with an agent computing device;
receive, from the mobile device, data associated with displaying the application on the mobile device screen;
convert the data associated with displaying the current state of the application on the mobile device screen into a video stream that provides a video representation of the data associated with displaying the current state of the application;
transmit the video stream to the agent computing device;
receive, from the agent computing device, data associated with markups drawn to the video stream at the agent computing device;
convert the data associated with markups drawn to the video stream into a second video stream, the second video stream displaying the video stream with the markups; and
transmit the second video stream to the mobile device such that the mobile device renders the marked up screen for display.

8. The non-transitory computer-readable storage medium of claim 7, the instructions, when executed, further causing the processor to:
receive a cancelation from the mobile device.

9. The non-transitory computer-readable storage medium of claim 7, the instructions, when executed, further causing the processor to:
encrypt the data associated with the screen and the data associated with displaying the application on the mobile device screen.

10. The non-transitory computer-readable storage medium of claim 7, the instructions, when executed, further causing the processor to:
provide an agent browser screen for display at the agent computing device that includes a chat box and a visual representation of the current state of the application on the mobile device screen.

11. The non-transitory computer-readable storage medium of claim 7, the instructions, when executed, further causing the processor to:
receive, from the agent computing device, a request to transmit for rendering at the mobile device instructions to perform an action that will alter the current state of the application on the mobile device screen.

12. The non-transitory computer-readable storage medium of claim 7, the instructions, when executed, further causing the processor to:
encrypt the data associated with markups drawn to the video stream.

13. A computer system comprising:
at least one processor for executing computer program instructions; and
a non-transitory computer-readable storage medium comprising stored computer program instructions that, when executed, cause the processor to:
request, from a mobile device having a mobile application and an associated co-browsing software development kit (SDK), a screen associated with the mobile application that is currently being displayed on a display of the mobile device;
receive, from the mobile device, authorization to initiate a co-browsing session with an agent computing device;
receive, from the mobile device, data associated with displaying the application on the mobile device screen;
convert the data associated with displaying the current state of the application on the mobile device screen into a video stream that provides a video representation of the data associated with displaying the current state of the application;
transmit the video stream to the agent computing device;
receive, from the agent computing device, data associated with markups drawn to the video stream at the agent computing device;
convert the data associated with markups drawn to the video stream into a second video stream, the second video stream displaying the video stream with the markups; and
transmit the second video stream to the mobile device such that the mobile device renders the marked up screen for display.

14. The computer system of claim 13, the instructions, when executed, further causing the processor to:
receive a cancelation from the mobile device.

15. The computer system of claim 13, the instructions, when executed, further causing the processor to:
encrypt the data associated with the screen and the data associated with displaying the application on the mobile device screen.

16. The computer system of claim 13, the instructions, when executed, further causing the processor to:
provide an agent browser screen for display at the agent computing device that includes a chat box and a visual representation of the current state of the application on the mobile device screen.

17. The computer system of claim 13, the instructions, when executed, further causing the processor to:
receive, from the agent computing device, a request to transmit for rendering at the mobile device instructions to perform an action that will alter the current state of the application on the mobile device screen.

18. The computer system of claim 13, the instructions, when executed, further causing the processor to:
encrypt the data associated with markups drawn to the video stream.

* * * * *

UNITED STATES PATENT AND TRADEMARK OFFICE
CERTIFICATE OF CORRECTION

PATENT NO. : 11,061,640 B2
APPLICATION NO. : 16/455249
DATED : July 13, 2021
INVENTOR(S) : Vishnoi Page 1 of 1

It is certified that error appears in the above-identified patent and that said Letters Patent is hereby corrected as shown below:

In the Claims

In Column 4, in Claim 5, Line 66, delete "to that" and insert -- that --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*